United States Patent
Li et al.

(10) Patent No.: US 11,345,772 B2
(45) Date of Patent: May 31, 2022

(54) CURABLE COMPOSITION

(71) Applicant: CANON KABUSHIKI KAISHA, Tokyo (JP)

(72) Inventors: Fei Li, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 16/562,716

(22) Filed: Sep. 6, 2019

(65) Prior Publication Data

US 2021/0070906 A1  Mar. 11, 2021

(51) Int. Cl.
*C08F 226/08* (2006.01)
*C08F 226/06* (2006.01)
(Continued)

(52) U.S. Cl.
CPC .............. *C08F 226/06* (2013.01); *C08F 2/48* (2013.01); *C08F 212/36* (2013.01); *C08F 220/18* (2013.01); *C08F 220/1806* (2020.02); *C08F 220/1807* (2020.02); *C08F 220/30* (2013.01); *C08F 224/00* (2013.01); *C09D 11/30* (2013.01)

(58) Field of Classification Search
CPC .... C08F 226/06; C08F 212/36; C08F 220/30; C08F 220/301; C08F 220/302; C08F 220/303; C08F 220/305; C08F 220/306; C08F 220/307; C08F 220/308; C08F 220/1806; C08F 220/1807; C09D 11/30; C09D 11/32; C09D 11/322; C09D 11/324; C09D 11/326; C09D 11/328; C09D 11/34; C09D 11/36; C09D 11/38
See application file for complete search history.

(56) References Cited

U.S. PATENT DOCUMENTS 4,939,070 A   7/1990   Brunsvold
5,274,059 A   12/1993  Kato
(Continued)

FOREIGN PATENT DOCUMENTS

EP   2423278 A1   2/2012
JP   06025359 A * 2/1994
(Continued)

OTHER PUBLICATIONS

ThemoFisher Scientific, "Glycidyl methacrylate Safety Data Sheet", Aug. 28, 2018, 8 pages accessed on Apr. 24, 2021 at https://www.fishersci.com/store/msds?partNumber=AC165890025&productDescription=GLYCIDYL+METHACRYLATE%2C+S+2.5KG&vendorld=VN00032119&countryCode=US&language=en (Year: 2018).*

(Continued)

*Primary Examiner* — Ling Siu Choi
*Assistant Examiner* — David L Miller
(74) *Attorney, Agent, or Firm* — Abel Schillinger, LLP

(57) ABSTRACT

A curable composition can comprise a polymerizable material and an initiator. The polymerizable material can comprise a first monomer and a second monomer, wherein the second monomer is soluble in the first monomer, and the second monomer includes a ring structure selected from a maleimide ring, a pyrone ring, or a 2-furanone rings. The curable composition can have a viscosity of not greater than 10 mPa·s, a fast curing kinetic, low shrinkage during curing, and is suitable for use in inkjet adaptive planarization.

16 Claims, 2 Drawing Sheets

(51) Int. Cl.
  *C08F 220/18* (2006.01)
  *C08F 224/00* (2006.01)
  *C08F 212/36* (2006.01)
  *C08F 2/48* (2006.01)
  *C08F 220/30* (2006.01)
  *C09D 11/30* (2014.01)

(56) References Cited

U.S. PATENT DOCUMENTS

| | | | |
|---|---|---|---|
| 5,585,417 A | 12/1996 | Beziers | |
| 5,618,857 A * | 4/1997 | Newberth, III | C09J 4/00 523/176 |
| 5,996,202 A | 11/1999 | Nguyen | |
| 6,479,211 B1 | 11/2002 | Sato | |
| 8,088,548 B2 | 1/2012 | Houlihan | |
| 2006/0116492 A1* | 6/2006 | Cheng | C08F 2/38 526/227 |
| 2014/0017401 A1 | 1/2014 | Bennett | |
| 2015/0368491 A1* | 12/2015 | Araki | C09D 11/40 428/131 |
| 2017/0042038 A1* | 2/2017 | Hamaguchi | G03F 7/0046 |
| 2017/0114235 A1 | 4/2017 | De Mondt et al. | |

FOREIGN PATENT DOCUMENTS

| | | | |
|---|---|---|---|
| JP | 2015140435 A * | 8/2015 | |
| JP | 2017181617 A * | 10/2017 | |

OTHER PUBLICATIONS

Shell Chemicals, Methyl ethyl ketone, Mar. 2016, 2 pages accessed on Apr. 24, 2021 at https://www.shell.com/business-customers/chemicals/our-products/solvents-chemical/ketones/Jcr_content/par/tabbedcontent/tab/textimage.stream/1459943761987/aa4a0ecc902a57b7ba182491ba379c14133dfab1/mek-s1213-global.pdf (Year: 2016).*

Dupont Water Solutions, "Divinyl Benzene (DVB)tehcmial manual" Mar. 2020 Version 3, 20 pages, accessed on Apr. 24, 2021 at https://www.dupont.com/content/dam/dupont/amer/US/en/water-solutions/public/documents/en/45-D02015-en.pdf (Year: 2020).*

National Library of Medicine, "hazardous Substances Data Bank Styrene", Nov. 28, 2018, PubChem accessed on Apr. 24, 2021 at https://pubchem.ncbi.nlm.nih.gov/source/hsdb/171#section=Hazardous-Substances-DataBank-Number (Year: 2018).*

Samchem Prasandha "Methyl Proxitol Acetate Propylene Glycol Monomethyl Ether Acetate" www.samchemprasandha.com, accessed on Apr. 24, 2021 at http://samchemprasandha.com/images/catalog/propylene_glycol_monomethyl_ether_acetate.pdf (Year: 2021).*

ThermoFisher Scientific "Safety Data Sheet 1-Methoxy-2-propanol", Nov. 16, 2010 Revision 4 accessed on Apr. 24, 2021 at https://www.fishersci.com/store/msds?partNumber=AC244990250&productDescription=1-METHOXY+2-PROPANOL+CA+25ML&vendorId=VN00032119&countryCode=US&language=en (Year: 2010).*

BASF "Methacrylic acid, techincal" Oct. 2017, accessed on Apr. 24, 2021 at https://www.acrylicmonomers.basf.com/portal/streamer?fid=232536 (Year: 2017).*

Osaka Organic Chemical Industry LTD, Benzyl Acrylate, accessed on Apr. 24, 2021 at https://www.ooc.co.jp/en/products/chemical/monofunctional/BZA (Year: 2021).*

National Library of Medicine, "Diglyme", PubChem accessed on Apr. 24, 2021 at https://pubchem.ncbi.nlm.nih.gov/compound/Diglyme (Year: 2021).*

Ch. Wohlfarth, B. Wohlfahrt Pure Organic Liquids C11 Landolt-Bornstein Group IV Physical Chemistry 18B, 2002, SpringerMaterials, 580-606. Accessed online at https://materials.springer.com/lb/docs/sm_lbs_978-3-540-48513-1_12 on Oct. 30, 2021 (Year: 2002).*

Cameo Chemicals, "Methyl Methacrylate" Cameo Chemicals, Jun. 1999, Acessed online at https://cameochemicals.noaa.gov/chris/MMM.pdf on Oct. 30, 2021 (Year: 1999).*

International Search Report & Written Opinion dated Dec. 2, 2020 with regard to International Application No. PCT/US41803.

* cited by examiner

CURABLE COMPOSITION

FIELD OF THE DISCLOSURE

The present disclosure relates to a curable composition, particularly to a curable composition for inkjet adaptive planarization.

BACKGROUND

Inkjet Adaptive Planarization (IAP) is a process which planarizes a surface of a substrate, e.g., a wafer containing an electronic circuit, by jetting liquid drops of a curable composition on the surface of the substrate, and bringing a flat superstrate in direct contact with the added liquid to form a flat liquid layer. The flat liquid layer is typically solidified under UV light exposure, and after removal of the superstrate a planar surface is obtained which can be subjected to subsequent processing steps, for example baking, etching, and/or further deposition steps. There exists a need for improved IAP materials leading to planar cured layers with high etch resistance, high mechanical strength, and good thermal stability.

SUMMARY

In one embodiment, a curable composition can comprise a polymerizable material and an initiator, wherein the polymerizable material comprises a first monomer and a second monomer, the second monomer including a ring structure selected from a maleimide-ring, a pyrone ring, or a 2-furanone ring; the second monomer is soluble in the first monomer, and the curable composition has a viscosity of not greater than 10 mPa·s.

In one aspect, an amount the second monomer can be at least 2 wt % and not greater than 20 wt % based on the total weight of the curable composition.

In a certain embodiment, the second monomer of the polymerizable material can include a maleimide ring structure. In aspects, the second monomer can include N-benzylmaleimide (N-BMI); N-cyclohexylmaleimide (N-CMI); N-phenylmaleimide (N-PMI); bis(3-ethyl-5-methyl-4-maleimidophenyl)methane (BEMMI); or any combination thereof.

In a further embodiment, the first monomer of the polymerizable material can include an acrylate-monomer. In one aspect, the acrylate monomer can include an aromatic group. In particular aspects, the acrylate monomer can include benzyl acrylate (BA); 1-naphthyl acrylate (1-NA); bisphenol A dimethacrylate (BPADMA); or any combination thereof.

In another embodiment, the polymerizable material of the curable composition can include at least one further monomer in addition to the first monomer and the second monomer. In one aspect, the at least one further monomer can include a substituted or unsubstituted divinyl benzene (DVB).

In a particular embodiment, the polymerizable material of the curable composition of the present disclosure can comprise an aromatic acrylate monomer, a monomer including a maleimide ring, and a substituted or unsubstituted divinyl benzene (DVB).

In one aspect, the curable composition can be essentially free of a non-polymerizable solvent.

In another embodiment of the present disclosure, a laminate can comprise a substrate and a cured layer overlying the substrate, wherein the cured layer can comprise an acrylate/maleimide copolymer; a total carbon content of at least 74%; and a weight loss after heat treatment at a temperature of 250° C. for 90 seconds being not greater than 2.5% based on the total weight of the cured layer before the heat treatment.

In one aspect, the cured layer of the laminate can have an average Storage Modulus of at least 4.5 GPa.

In another aspect, the acrylate/maleimide copolymer contained in the cured layer of the laminate can further comprise divinyl benzene.

In yet a further embodiment, a method of forming an article can comprise: applying a layer of a curable composition on a substrate, wherein the curable composition comprises a polymerizable material and a photoinitiator, and wherein the polymerizable material comprises a first monomer and a second monomer, the second monomer including a ring structure selected from a maleimide-ring, a pyrone ring, or a 2-furanone ring; the second monomer is soluble in the first monomer; and the curable composition has a viscosity of not greater than 10 mPa·s. The method can further include bringing the curable composition into contact with a superstrate; curing the curable composition with light or heat to form a cured layer; removing the superstrate from the cured layer; and processing the substrate with the cured layer to make the article.

In one aspect of the method, curing can comprise a conversion of at least 65% of all double bonds contained in the polymerizable material within 10 seconds.

In another aspect of the method, the polymerizable material of the curable composition can include an acrylate monomer as the first monomer and a monomer including a maleimide ring as the second monomer. In a further aspect, the polymerizable material can include at least one further monomer. In a particular aspect, the at least one further monomer can be a substituted or unsubstituted divinyl benzene.

In yet another aspect of the method, the cured layer can have a weight loss after a heat treatment at a temperature of 250° C. for 90 seconds of not greater than 2.5% based on the total weight of the cured layer.

BRIEF DESCRIPTION OF THE DRAWINGS

Embodiments are illustrated by way of example and are not limited in the accompanying figure.

Figure 1:
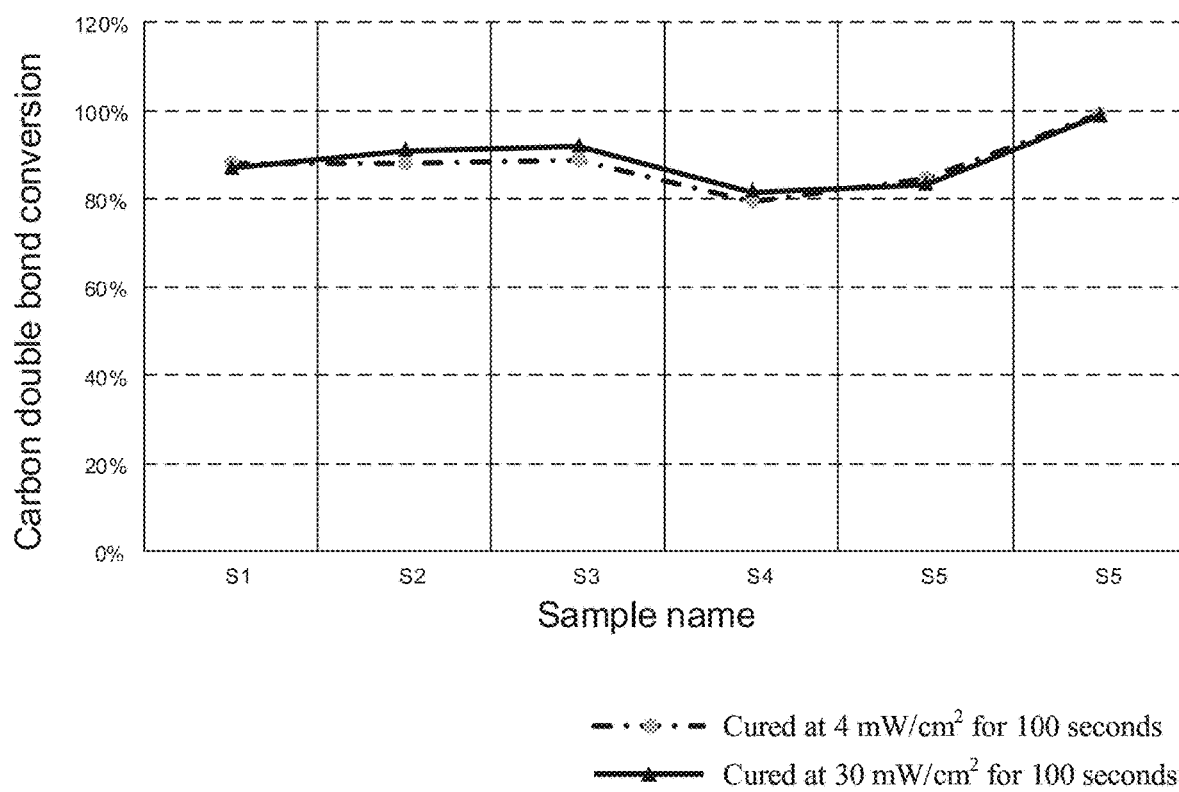
FIG. 1 includes a graph illustrating the percentage of C=C double bond conversion after 100 seconds curing at different light intensities according to embodiments.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a curable composition comprising a polymerizable material which includes a first monomer and a second monomer, wherein the second monomer is soluble in the first monomer and includes a ring structure. In certain aspects, the ring structure contained in the second monomer can be a maleimide-ring, or a pyrone ring, or a 2-furanone ring. The curable composition can have a viscosity of not greater than 10 mPa s, and may be particularly suitable for use in inkjet adaptive planarization (IAP) for making planar cured layers with a fast curing kinetic, a high thermal stability, good mechanical strength and a high etch resistance.

As used herein, the term monomer relates to one or more polymerizable monomer types. If not indicated otherwise, the monomer types can be substituted or unsubstituted monomers.

In a particular embodiment, the second monomer can be a monomer including at least one maleimide ring. In one aspect, the second monomer can include one maleimide ring, hereinafter also called a mono-maleimide. In yet a further aspect, the second monomer can include two maleimide rings, hereinafter called a bis-maleimide. In a particular aspect, the maleimide ring can be substituted on the ring nitrogen with an aromatic group. Non-limiting examples of mono-maleimides can be: N-benzylmaleimide (N-BMI) (CAS 1631-26-1); N-cyclohexylmaleimide (N-CMI) (CAS 1631-25-0); N-phenylmaleimide (N-PMI) (CAS 941-69-5); bis(3-ethyl-5-methyl-4-maleimidophenyl)methane (BE-MMI) (CAS 105391-33-1); N-(4-nitrophenyl)-maleimide (CAS 4338-06-1); N-tert-butylmaleimide (CAS 4144-22-3), N-ethyl-maleimide (CAS 128-53-0); N-(2-hydroxyethyl) maleimide (CAS 1585-90-6); N-(2,4,6-trichlorophenyl)maleimide (CAS 13167-25-4); moreover, non-limiting examples of bis-maleimides may be: bis(3-ethyl-5-methyl-4-maleimidophenyl)methane (BEMMI) (CAS 105391-33-1); 1,1'-(methylenedi-4,1-phenylene)bismaleimide (CAS 136760-54-5); 1,6-bis-maleimido-hexane (CAS 4856-87-5); 1,4-bis-maleimidobutane (CAS 28537-70-4); 2,2-bis[4-(4-maleimidophenoxy)phenyl]propane (CAS 79922-55-7); 1,8-bis-maleimidotetraethyleneglycol (CAS 115597-84-7); ethylene-bis-maleimide (CAS 5132-30-9); 1,4-phenylene-bis-maleimide (CAS 3278-31-7); N,N'-(1,3-phenylene)dimaleimide (CAS 2006-93-7); 3-N-maleimidobenzoic acid N-succinimidyl ester (CAS 58626-38-3); or 1,11-bis-maleimidotetraethyleneglycol (CAS 86099-06-1).

The first monomer of the polymerizable material can be present in a larger amount than the second monomer and may dissolve the second monomer. Accordingly, the first monomer can act as a solvent, and the curable composition can be essentially free of a non-polymerizable solvent. In another certain aspect, however, the curable composition can also include a non-polymerizable solvent.

In one aspect, a weight % ratio of the first monomer to the second monomer can be not greater than 3:1; such as not greater than 4:1, not greater than 5:1, not greater than 8:1, or not greater than 10:1.

In one embodiment, the first monomer can include at least one acrylate monomer. As used herein, the term acrylate monomer relates to any monomer structure including an acrylate or substituted acrylate unit, for example a methacrylate unit. In a particular aspect, the acrylate monomer can include an aromatic group. Non-limiting examples of suitable acrylate monomers can be benzyl acrylate (BA); 1-naphthyl acrylate (1-NA); bisphenol A dimethacrylate (BPADMA); or any combination thereof. Other acrylate monomers that can dissolve maleimide-monomers can be, for example, dicyclopentenyl oxyethyl acrylate, dicyclopentanyl acrylate, o-phenyl benzyl acrylate and isobornyl acrylate, but are not limited thereto.

In another embodiment, the polymerizable material can include at least one further monomer type, and/or a polymerizable oligomer and/or a polymerizable polymer. In a particular embodiment, the at least one further monomer can be a di- or trifunctional monomer, having the ability to act as a cross-linking agent. In one aspect, the at least one further monomer can be substituted or unsubstituted divinyl benzene (DVB).

In one particular embodiment, the polymerizable material of the curable composition can comprise an aromatic acrylate monomer, a monomer including a maleimide ring, and a substituted or unsubstituted divinyl benzene (DVB).

Important for the selection of monomers is the aspect of maintaining a low viscosity of the curable composition before curing. In one embodiment, the viscosity of the curable composition can be not greater than 20 mPa·s, such as not greater than 15 mPa·s, not greater than 12 mPa·s, not greater than 10 mPa·s, not greater than 9 mPa·s, or not greater than 8 mPa·s. In other certain embodiments, the viscosity may be at least 2 mPa·s, such as at least 3 mPa·s, at least 4 mPa·s, or at least 5 mPa·s. In a particularly preferred aspect, the curable composition can have a viscosity of not greater than 10 mPa·s. As used herein, all viscosity values relate to viscosities measured at a temperature of 23° C. with the Brookfield method using a Brookfield Viscometer at 200 rpm.

The amount of polymerizable material in the curable composition can be at least 70 wt %, at least 75 wt %, at least 80 wt %, at least 85 wt %, at least 90 wt %, or at least 95 wt %. In another aspect, the amount of polymerizable material may be not greater than 99 wt %, such as not greater than 98 wt %, not greater than 97 wt %, not greater than 95 wt %, not greater than 93 wt %, not greater than 90 wt %, or not greater than 85 wt % based on the total weight of the curable composition. The amount of polymerizable material can be a value between any of the minimum and maximum values noted above. In a particular aspect, the amount of polymerizable material can be at least 80 wt % and not greater than 98 wt %.

The curable composition can further contain one or more optional additives. Non-limiting examples of optional additives can be stabilizers, dispersants, solvents, surfactants, inhibitors or any combination thereof.

It has been surprisingly discovered that by selecting certain combinations of first and second polymerizable monomers, wherein the second monomer is soluble in the first monomer and includes a maleimide ring, curable compositions can be made having a desired low viscosity of less than 10 mPa·s, and leading to cured materials having a low shrinkage during UV curing, an excellent mechanical stability, a high heat stability, and a good etch resistance.

In one embodiment, the curable composition can be applied on a substrate to form a cured layer. The curing can be conduced under light radiation, e.g. UV radiation, or exposure to heat. As used herein, the combination of substrate and cured layer overlying the substrate is called a laminate.

In one aspect, the cured layer of the laminate can have a hardness of at least 0.3 GPa, such as at least 0.32 GPa, at least 0.34 GPa, at least 0.36 GPa, or at least 0.38 GPa.

In another aspect, the storage modulus of the cured layer can be at least 4.5 GPa, such as at least 4.6 GPa, at least 4.7 GPa, at least 4.8 GPa, at least 4.9 GPa, at least 5.0 GPa, or at least 5.1 GPa.

The cured layer of the laminate can further have a good heat stability. In one aspect, the photo-cured layer can have a weight loss after a heat treatment at 250° C. for 90 seconds of not greater than 4%, or not greater than 3.5%, or not greater than 3%, or not greater than 2.7%, or not greater than 2.5%, or not greater than 2.3%, or not greater than 2.0%, or not greater than 1.7%.

The cured layer of the laminate of the present disclosure can have a high carbon content. In one embodiment, the carbon content of the cured layer can be at least 70 wt % based on the total weight of the cured layer, such as at least 71 wt %, at least 72 wt %, at least 73 wt %, at least 74 wt %, or at least 75 wt %. In a particular aspect, the carbon content can be at least 74 wt %.

In another aspect, the cured layer of the laminate may have a hydrogen content of not greater than 6.3 wt % based on the total weight of the cured layer, such as not greater than 6.2 wt %, not greater than 6.1 wt %, or not greater than 6.0 wt %.

In yet a further aspect, the glass transition temperature of the cured layer of the laminate can be at least 80° C., such as at least 85° C., at least 90° C., at least 100° C., at least 110° C., or at least 115°.

In one aspect, the cured layer of the laminate can have an Ohnishi number of not greater than 3.0, such as not greater than 2.9, not greater than 2.8, not greater than 2.7, not greater than 2.65, or not greater than 2.6. In another aspect, the Ohnishi number may be at least 1.8, such as at least 1.9, at least 2.0, at least 2.1, at least 2.2, or at least 2.3.

The present disclosure is further directed to a method of forming a cured layer. The method can comprise applying a layer of the curable composition described above over a substrate; bringing the curable composition into contact with a superstrate; curing the curable composition by exposure to light or heat to form a cured layer; and removing the superstrate from the cured layer.

It has been further surprisingly observed that curing of the curable composition of the present disclosure can require a very short curing time. In one embodiment, at least 65% of all C=C double bonds contained in the polymerizable material can be converted within a time of 10 seconds UV radiation. In other aspects, the C=C conversion after 10 seconds curing under UV radiation can be at least 70%, such as at least 75%, at least 80%, at least 85%, or at least 90% based on the total amount of C=C double bonds contained in the polymerizable material.

In another aspect, at least 80% of all double bonds of the polymerizable material can be converted after 100 seconds curing under UV radiation, such as at least 85%, at least 90%, at least 95%, or at least 98% based on the total amount of C=C double bonds contained in the polymerizable material of the composition.

The substrate and the solidified (cured) layer may be subjected to additional processing to form a desired article, for example, by including an etching process to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like. In a certain aspect, the substrate may be processed to produce a plurality of articles (devices).

The cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly discovered that certain combinations of polymerizable monomers containing aromatic groups in a curable composition can have very suitable properties especially for IAP processing. The curable composition of the present disclosure can have a desired low viscosity of not greater than 10 mPa·s and can form cured layers with high mechanical strength, high thermal stability and low shrinkage.

EXAMPLES

The following non-limiting examples illustrate the concepts as described herein.

Example 1

Preparing of Photocurable IAP Compositions.

Six photocurable compositions (samples S1 to S6) were prepared by combining for each composition 50 wt % benzylacrylate (BA), as first monomer, and 10 wt % of a monomer including a maleimide ring, wherein the maleimide ring was substituted on the N position with an aromatic group, as second monomer. The monomer including a maleimide ring was selected from: N-benzylmaleimide (N-BMI); N-cyclohexylmaleimide (N-CMI); N-phenylmaleimide (N-PMI); and bis(3-ethyl-5-methyl-4-maleimidophenyl)methane (BEMMI). Each composition further contained 20 wt % naphthylacrylate (NA) and one or two other polymerizable monomers selected from divinylbenzene (DVB) and bisphenyl A dimethacrylate (BPADMA). Moreover, each composition contained 3 wt % Irgacure 819 from LabNetworks and 1 wt % surfactant Chemguard 5554 from Chemguard based on the total weight of the composition.

A summary of the types and amounts of polymerizable monomers contained in the compositions of samples S1 to S6 can be seen in Table 1. The wt % amounts of the monomers listed in Table 1 are all based on 100 wt % of the total amount of polymerizable material, which means that the monomer amounts listed for each composition in Table 1 add up to 100 wt %.

Table 1 further includes the carbon content, hydrogen content, and the Ohnishi number of the compositions. The Ohnishi number (ON) is an empirical parameter and calculated as the ratio of total number of atoms (Nt) in the polymer repeat unit divided by the difference between the number of carbon atoms (Nc) and oxygen atoms ($N_O$) in the unit, ON=Nt/($N_C$−$N_O$). For the calculation of the Ohnishi number, it was assumed that the cured materials contained 100 wt % of the polymerized monomer units formed by addition polymerization with no loss of atoms during polymerization.

TABLE 1

| Sample | Type and amount of monomer [wt %] | | | | | Carbon [wt %] | Hydrogen [wt %] | Ohnishi |
|---|---|---|---|---|---|---|---|---|
| S1 | BA 50 | 1-NA 20 | N-CHI 10 | | BPADMA 20 | 74.6 | 6.2 | 2.691 |
| S2 | BA 50 | 1-NA 20 | N-BMI 10 | | BPADMA 20 | 75.0 | 5.9 | 2.622 |
| S3 | BA 50 | 1-NA 20 | N-PMI 10 | | BPADMA 20 | 74.9 | 5.8 | 2.616 |
| S4 | BA 50 | 1-NA 20 | N-PMI 10 | DVB 5 | BPADMA 20 | 75.8 | 5.9 | 2.579 |
| S5 | BA 45 | 1-NA 20 | N-BMI 10 | DVB 5 | BPADMA 20 | 75.9 | 6.0 | 2.584 |
| S6 | BA 50 | 1-NA 30 | BEMMI 10 | | BPADMA 10 | 75.6 | 5.9 | 2.582 |
| C1 | BA 50 | 1-NA 30 | | | BPADMA 20 | 75.8 | 6.0 | 2.59 |

Table 1 also includes a comparative sample C1, which did not contain a maleimide monomer in the polymerizable material, and is a commercial IAP resist material.

Other tested properties of samples S1 to S6 and C1, such as viscosity, UV shrinkage during curing, and glass transition temperature Tg after curing, are summarized in Table 2. The curing was conducted after applying a liquid film of the photocurable composition of about 100 nm thickness on a glass substrate, and subjecting the liquid film to a UV light intensity of 4 mW/cm² and curing it for 600 seconds, which corresponds to a curing energy dosage of 2.4 J/cm².

Table 2 further includes for several samples data for the weight loss of the samples at 250° C., which should simulate the wafer baking process. The weight loss data were obtained by conducting thermal gravimetric analysis (TGA) at a heating speed of 20° C. per minute up to 250° C., holding the temperature for 90 seconds at this temperature and measuring the weight loss. It was surprisingly observed that samples S4, S5, and S6 all had a weight loss after the heat treatment below 3%. An exceptionally low weight loss could be obtained for sample S6 with only 1.34%. Not being bound to theory, the weight loss during heat treatment at 250° C. of the samples can indicate that in a sample with a lower weight loss, e.g., samples S6, a larger degree of monomers were polymerized than in a sample of a higher weight loss, e.g., sample S4.

TABLE 2

| Sample | Viscosity [mPa · s] | UV shrinkage during curing [%] | Tg [° C.] | Weight loss at 250° C. TGA |
|---|---|---|---|---|
| S1 | 8.43 | 4.8 | 100 | |
| S2 | 8.80 | 6.7 | 99 | |
| S3 | 8.60 | 4.8 | 98 | |
| S4 | 8.26 | 3.7 | 118 | 2.56 |
| S5 | 7.36 | 5.9 | 111 | 2.05 |
| S6 | 10.0 | 5.4 | 81 | 1.34 |
| C1 | 8.10 | 4.1 | 90 | 2.20 |

The viscosity of the samples was measured at 23° C., using a Brookfield Viscometer LVDV-II+Pro at 200 rpm, with a spindle size #18. For the viscosity testing, about 6-7 mL of sample liquid was added into the sample chamber, enough to cover the spindle head. For all viscosity testing, at least three measurements were conducted and an average value was calculated.

The UV shrinkage measurements were performed with an Anton Paar MCR-301 rheometer coupled to an UV curing system and heater. For the testing, a 7 μl drop of the test sample was added onto a plate and a temperature control hood was released to insulate the drop and the measuring unit. The amount of the sample was designed to obtain a thickness (hereinafter also called height) of the sample layer of slightly higher than 0.1 mm. By pre-setting the target height to 0.1 mm, the measuring unit moved down to the set value, causing extra amount of resist flowing off the plate. This insured that the exact height of the liquid resist was 0.1 mm before curing. Thereafter, the resist was cured with a UV power of 4 mW/cm² at 365 nm for 600 seconds. After curing of the resist, the height was measured again and the linear shrinkage calculated according to equation (1): SL= ($L_R$−$L_{CR}$/$L_R$)×100% (1), wherein $L_R$ is the thickness of the photocurable composition layer before curing and $L_{CR}$ is the thickness of the cured photocurable composition layer.

Example 2

The storage modulus and hardness of the photo-cured samples S2, S5, and S6 described in Example 1 were measured, and compared with a comparative sample C2.

Comparative sample C2 was a typical resist material for nanoimprint lithography (NIL). C2 contained the following ingredients: isobornyl acrylate (IBOA) in an amount of 33.3 wt %, dicyclopentyl acrylate (DCPA) in an amount of 19.4 wt %, BA in an amount of 22.2 wt %, neopentyl glycol diacrylate (A-NPG) in an amount of 18.5 wt %, photoinitiator Irgacure 907 and Irgacure 651 in an amount of 0.925 wt % and 1.85%, respectively, and surfactant in an amount of 3.79 wt %. Comparative sample C2 had a viscosity of 6.8 mPa s, a UV shrinkage during curing of 4.5%, a carbon content of 71%, a glass transition temperature of 90° C., and an Ohnishi number of 3.26.

A summary of the test results is shown in Table 3. The test results show that samples S2, S5, and S6 all had a higher storage modulus and hardness than comparative sample C2. The highest storage modulus was achieved with sample S6, which is a bi-functional maleimide monomer (containing two maleimide rings).

While baking (heat treatment at 250° C. for two minutes before conducting the indentation test) had nearly no influence on the compositions including a maleimide monomer (samples S2, S5, and S6), the comparative sample C2 showed an increase in hardness after baking to reach a value close to sample S6.

TABLE 3

| Sample | Preparation Method | Avg. Contact Depth [nm] | Avg. Storage Modulus [GPa] | Hardness [GPa] |
|---|---|---|---|---|
| S2 | standard | 198 ± 1.0 | 4.92 ± 0.21 | 0.382 ± 0.023 |
|  | standard + baking | 198 ± 1.1 | 5.00 ± 0.26 | 0.335 ± 0.027 |
| S5 | standard | 198 ± 1.3 | 4.58 ± 0.12 | 0.368 ± 0.020 |
|  | standard + baking | 195 ± 1.4 | 4.52 ± 0.15 | 0.363 ± 0.025 |
| S6 | standard | 201 ± 1.3 | 5.26 ± 0.33 | 0.295 ± 0.030 |
|  | standard + baking | 201 ± 1.3 | 5.54 ± 0.35 | 0.312 ± 0.033 |
| C2 | standard | 200 ± 1.7 | 4.18 ± 0.28 | 0.253 ± 0.030 |
|  | standard + baking | 197 ± 1.2 | 4.27 ± 0.25 | 0.306 ± 0.025 |

The storage modulus and glass transition temperature were measured with an Anton-Paar MCR-301 rheometer coupled with a Hamamatsu Lightningcure LC8 UV source. The sample was radiated with a UV intensity of 1.0 mW/cm$^2$ at 365 nm controlled by a Hamamatsu 365 nm UV power meter. Software named RheoPlus was used to control the rheometer and to conduct the data analysis. The temperature was controlled by a Julabo F25-ME water unit and set to 23° C. as starting temperature. For each sample testing, 7 µl resist sample was added onto a glass plate positioned directly underneath the measuring system of the rheometer. Before starting with the UV radiation, the distance between glass plate and measuring unit was reduced to a gap of 0.1 mm. The UV radiation exposure was continued until the storage modulus reached a plateau, and the height of the plateau was recorded as the storage modulus listed in Table 3.

After the UV curing was completed, the temperature of the cured sample was increased by controlled heating to measure the change of the storage modulus in dependency to the temperature to obtain the glass transition temperature $T_g$. As glass transition temperature $T_g$ was considered the temperature corresponding to the maximal value of Tangent (θ).

The hardness was calculated from loading curves measured with the Hysitron TI 950 Triboindenter by indent to 200 nm, using the displacement controlled loading function. During indentation, the force was measured, from which the loading curves could be obtained. The hardness (H) was calculated according to the following equation: $H=P_{max}/A_c$, wherein $P_{max}$ is the maximum applied force, and $A_c$ is the contact area determined by the tip area function.

Example 3

Investigation of Double Bond Conversion.

Fourier-transform infrared spectroscopy (FTIR) was conducted to monitor the real-time UV curing kinetics of samples S1 to S6 described in Example 1. The decrease of the peak for the double bond C=C in the IR spectrum at around 810 cm$^{-1}$ was observed in real time after initiating the curing reaction. The applied UV light intensity was 4 mW/cm$^2$ and 30 mW/cm$^2$ for a time of 100 seconds. As illustrated in FIG. 1, no difference could be seen in the double bond conversion after 100 seconds if a light intensity of 4 mW/cm$^2$ was applied or 30 mW/cm$^2$.

Figure 2:
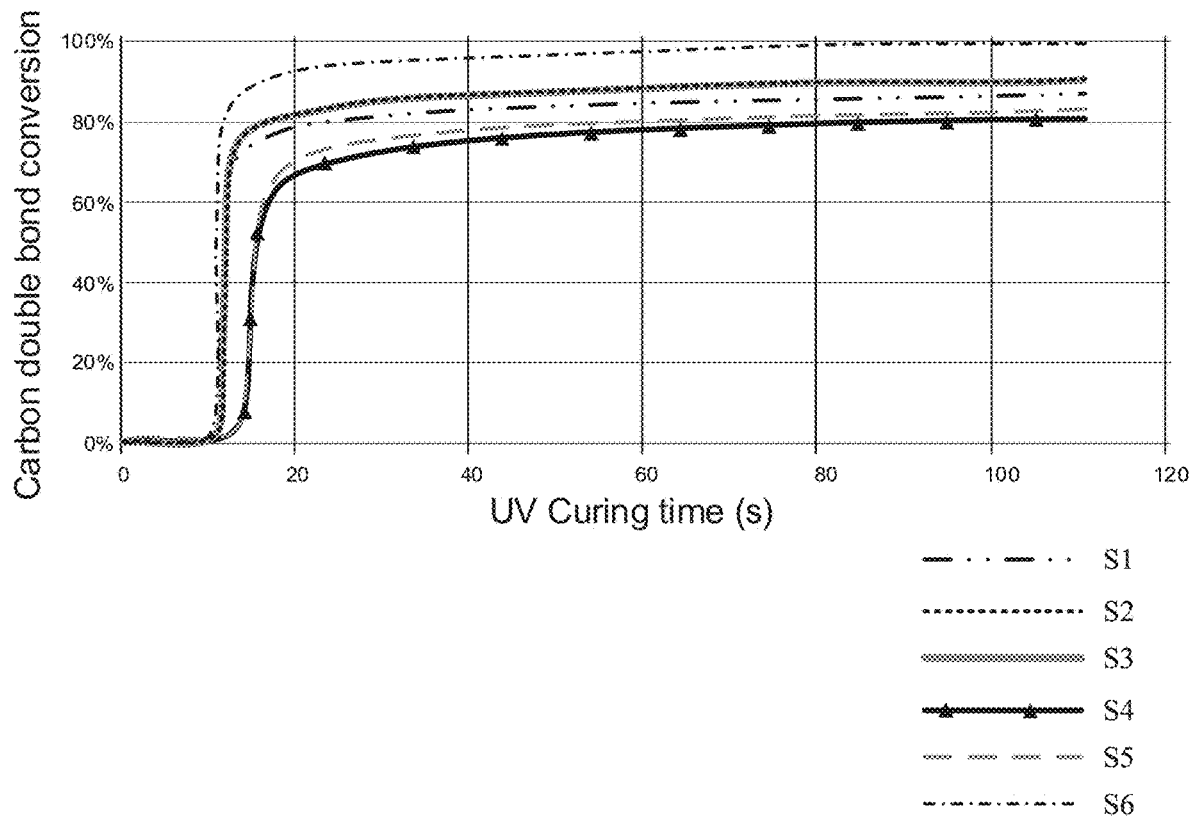
FIG. 2 includes a graph illustrating the percentage of C=C double bond conversion with increasing curing time according to embodiments.

Furthermore, as illustrated in FIG. 2, in all samples S1 to S6, the majority of the double bond conversion happened in a very short time, such as during the first 10 seconds after initiating the polymerization reactions by UV radiation. In FIG. 2, the beginning of the UV radiation started at 10 seconds time and was conducted for a time period of 100 seconds, ending at 110 seconds time of the x-axis.

The highest double bond conversion (close to 100%) was reached for Sample S6, which includes a bi-functional maleimide monomer. However, samples S2 to S5 (including a mono-functional maleimide monomer) also reached high conversion rates between 82.8% and 92.4% after 100 seconds curing.

Table 4 below shows the percent conversion of double bonds for each tested sample at 10 second and at 100 seconds.

TABLE 4

| Sample | C=C Conversion after 10 s [%] | C=C Conversion after 100 s [%] |
|---|---|---|
| S1 | 78.5 | 89.2 |
| S2 | 82.1 | 90.0 |
| S3 | 82.5 | 89.6 |
| S4 | 65.8 | 82.5 |
| S5 | 70.2 | 82.8 |
| S6 | 91.9 | 99.0 |

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A curable composition comprising a polymerizable material and an initiator, wherein
   the polymerizable material comprises a first monomer and a second monomer, the second monomer including a ring structure selected from a maleimide-ring, a pyrone ring, or a 2-furanone ring;
   the second monomer is soluble in the first monomer;
   the curable composition has a viscosity of not greater than 10 mPa·s at 23° C. and 200 rpm;
   the first monomer includes an acrylate monomer including an aromatic group;
   an amount of the polymerizable material is at least 80 wt % based on a total weight of the curable composition; and
   a total carbon content of the curable composition after curing is at least 74 wt %.

2. The curable composition of claim 1, wherein an amount of the second monomer is at least 2 wt % and not greater than 20 wt % based on the total weight of the curable composition.

3. The curable composition of claim 1, wherein the second monomer includes a maleimide ring structure.

4. The curable composition of claim 3, wherein the second monomer includes N-benzylmaleimide (N-BMI); N-cyclohexylmaleimide (N-CMI); N-phenylmaleimide (N-PMI); bis(3-ethyl-5-methyl-4-maleimidophenyl)methane (BE-MMI); or any combination thereof.

5. The curable composition of claim 1, wherein the acrylate monomer includes benzyl acrylate (BA); 1-naphthyl acrylate (1-NA); bisphenol A dimethacrylate (BPADMA); or any combination thereof.

6. The curable composition of claim 1, comprising at least one further monomer.

7. The curable composition of claim 6, wherein the at least one further monomer includes a substituted or unsubstituted divinyl benzene (DVB).

8. The curable composition of claim 7, wherein the polymerizable material comprises an aromatic acrylate monomer, a monomer including a maleimide ring, and a substituted or unsubstituted divinyl benzene (DVB).

9. The curable composition of claim 1, wherein the curable composition is free of a non-polymerizable solvent.

10. A method of manufacturing an article comprising:
   applying a layer of a curable composition on a substrate, wherein the curable composition comprises a polymerizable material and a photoinitiator, and wherein the polymerizable material comprises a first monomer and a second monomer, the second monomer including a ring structure selected from a maleimide-ring, a pyrone ring, or a 2-furanone ring; the second monomer is soluble in the first monomer; the curable composition has a viscosity of not greater than 10 mPa·s at 23° C. and 200 rpm; the first monomer includes an acrylate monomer including an aromatic group; an amount of the polymerizable material is at least 80 wt % based on a total weight of the curable composition; and a total carbon content of the curable composition after curing is at least 74 wt %;
   bringing the curable composition into contact with a superstrate;
   curing the curable composition with light or heat to form a cured layer;
   removing the superstrate from the cured layer; and
   processing the substrate with the cured layer to make the article.

11. The method of claim 10, wherein curing comprises a conversion of at least 65% of all double bonds contained in the polymerizable material within 10 seconds.

12. The method of claim 10, wherein the polymerizable material includes an acrylate monomer as the first monomer and a monomer including a maleimide ring as the second monomer type.

13. The method of claim 10, wherein the polymerizable material includes at least one further monomer.

14. The method of claim 13, wherein the at least one further monomer is substituted or unsubstituted divinyl benzene.

15. The method of claim 10, wherein the cured layer has a weight loss after a heat treatment at a temperature of 250° C. for 90 seconds of not greater than 2.5% based on the total weight of the cured layer.

16. A curable composition comprising a polymerizable material and an initiator, wherein
   the polymerizable material comprises a first monomer and a second monomer, the second monomer including a ring structure selected from a maleimide-ring, a pyrone ring, or a 2-furanone ring;
   the second monomer is soluble in the first monomer;
   the curable composition has a viscosity of not greater than 10 mPa·s at 23° C. and 200 rpm;
   the first monomer includes an acrylate monomer including an aromatic group;
   an amount of the polymerizable material is at least 80 wt % based on a total weight of the curable composition; and
   the second monomer includes bis(3-ethyl-5-methyl-4-maleimidophenyl)methane (BEMMI).

* * * * *